United States Patent [19]
Alff et al.

[11] Patent Number: 5,120,588
[45] Date of Patent: Jun. 9, 1992

[54] COMPOSITE ANNULAR ENCODER AND METHOD FOR PRODUCING IT

[75] Inventors: Denis Alff; Christian Hajzler, both of Annecy, France

[73] Assignee: Ingersoll-Rand Company, Woodcliff Lake, N.J.

[21] Appl. No.: 637,463

[22] Filed: Jan. 4, 1991

[30] Foreign Application Priority Data

Feb. 23, 1990 [FR] France ................... 90-02251

[51] Int. Cl.$^5$ ..................... B32B 3/08; B32B 3/10
[52] U.S. Cl. ................... 428/66; 428/900; 428/65
[58] Field of Search ............ 428/65, 66, 900; 192/107 R, 107 M

[56] References Cited

U.S. PATENT DOCUMENTS

| | | | |
|---|---|---|---|
| 1,754,233 | 4/1930 | Fisher | 192/107 R |
| 1,780,710 | 11/1930 | Kattwinkel | 192/107 R |
| 3,654,777 | 4/1942 | Grundman | 192/107 M |
| 3,848,313 | 11/1974 | Guyonnet | 192/107 M |
| 4,646,900 | 3/1987 | Crawford et al. | 192/107 M |

Primary Examiner—Alexander S. Thomas
Attorney, Agent, or Firm—Michael H. Minns; John C. Bigler

[57] ABSTRACT

A magnetic encoder ring formed of a toothed annular metal disk with a concentric thermoplastic ring cast around the toothed annular metal disk.

8 Claims, 2 Drawing Sheets

COMPOSITE ANNULAR ENCODER AND METHOD FOR PRODUCING IT

BACKGROUND OF THE INVENTION

This invention relates generally to encoders used in bearings. It more particularly relates to a method of forming a rigid composite annular encoder, free of internal stresses.

It would be advantageous to provide an alternative directed to overcoming limitations associated with past devices and methods. Accordingly, a suitable alternative is provided including features more fully disclosed hereinafter.

SUMMARY OF THE INVENTION

In one aspect of the present invention, this is accomplished by providing a composite annular encoder comprising a toothed metal annular disk which is partly encased in a thermoplastic material whereby there is clearance between the thermoplastic material and the teeth on the metal disk.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

An object of the invention is to provide a rigid composite annular encoder, free of internal stresses, formed by joining a metal disk to a thermoplastic material.

Another object of the invention is to provide a method for producing an assembled multipolar annular magnetic encoder, comprising a molded thermoplastic element filled with magnetized ferrite and a concentric toothed annular disk, which has a mounting support surface formed by stamping the disk element.

One application of this composite annular encoder is in bearings.

According to the invention, a toothed annular disk is placed in the cavity of a mold, into which a thermoplastic material is injected and distributed concentrically around the disk and between the teeth of the disk to form a cast-on ring, separated from the bottom and top of each tooth of the disk by a radial clearance. Then the composite disk is magnetized.

The mechanical strength and precision of the bond between the disk and the ring are thus completely ensured. The advantage of the method is based on the fact that it prevents the creation of residual stresses following the molding process and permits differential expansion of the overlapping disk and ring without distortion of their placement or the creation of stresses in the materials.

The annular encoder thus obtained can be mounted on any exterior device by means of the metal disk, the manner in which the latter is mounted on the device being immaterial: force-fitting, gluing, riveting, or any other known method can be used.

Figure 1:
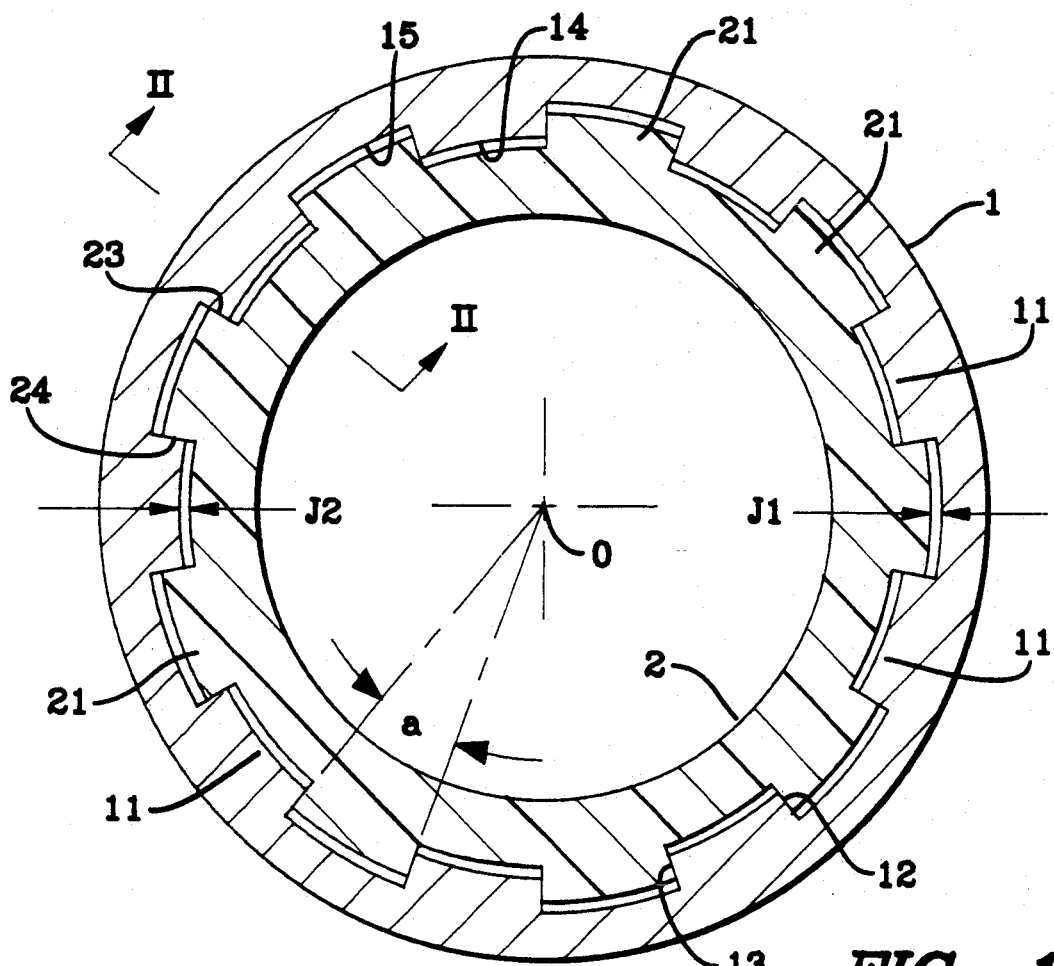
FIG. 1 is an axial cross-sectional view of the annular encoder.

The annular encoder shown in FIG. 1 has a stamped metal disk 1, the inner circumference of which has multiple teeth 11, the opposite sides of which 12, 13 are situated in the radial planes of aperture angle "a" passing through axis O of the disk.

The tops 14 and bottoms 15 of teeth 11 are curved to correspond to the segments of the arc centered on axis O of the part.

A molded plastic ring 2 with peripheral teeth 21, the opposite sides of which 23, 24 are in contact with the corresponding sides of teeth 11, is set into the disk. The bottoms and tops of teeth 21 are separated by radial clearances J2, J1 from tops 14 and bottoms 15 of the adjacent teeth 11.

As a result of differential expansion between disk 1 and ring 2, each point of disk 11 is shifted radially, and clearances J1, J2 vary without creating circumferential stresses in the ring.

Figure 2:
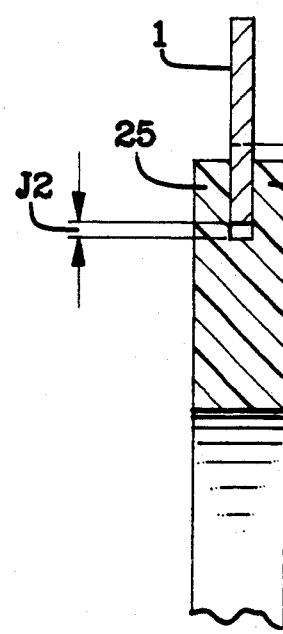
FIG. 2 is a larger-scale radial cross-sectional view of the encoder along line II—II of FIG. 1.

Plastic ring 2 is held axially according to FIG. 2 by circular crowns 24, 25, located axially on either side of teeth 11 and molded together with the ring.

Metal disk 1 also has an exposed outer (FIG. 1 or 2) or inner (FIGS. 5, 6) section, designed to form a mounting support surface for the encoder during a stamping operation.

Figure 3:
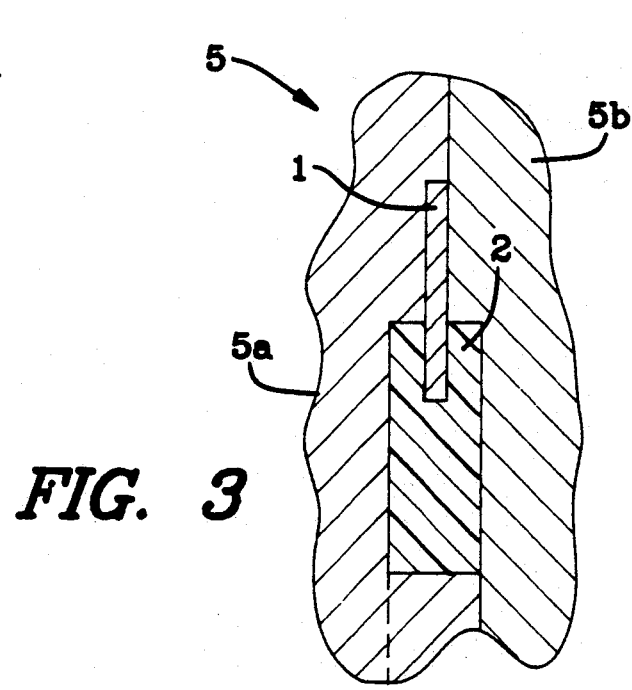
FIG. 3 is a schematic diagram of the mold used to produce the encoder shown in FIG. 1.

FIG. 3 is a schematic diagram of a production mold 5, in which parts 5a, 5b contain the cavity for receiving the toothed annular disk 1 and the cavity for receiving the thermoplastic material for the casting of ring 2.

Figure 4:
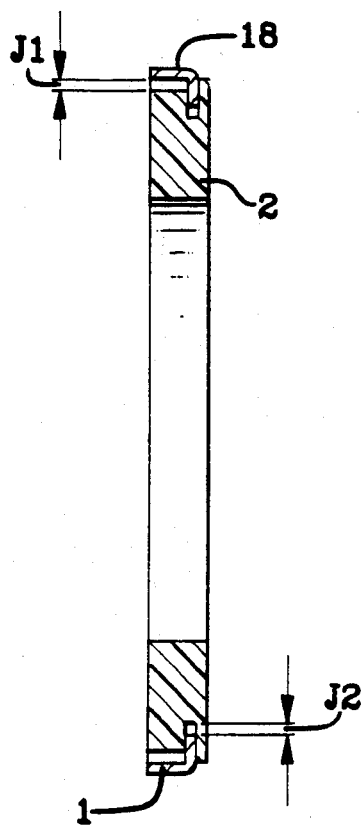
FIG. 4 is a radial cross-sectional view of the encoder with a mounting support surface formed on the periphery of the metallic disk.

The method can be applied advantageously to annular disk 1 with inner toothing according to FIGS. 1, 2, and 4. Thermoplastic ring 2 is advantageously cast inside of annular disk 1. Radial clearances J1, J2 are then formed as the ring cools due to the natural shrinkage of the material after casting.

Figure 5:
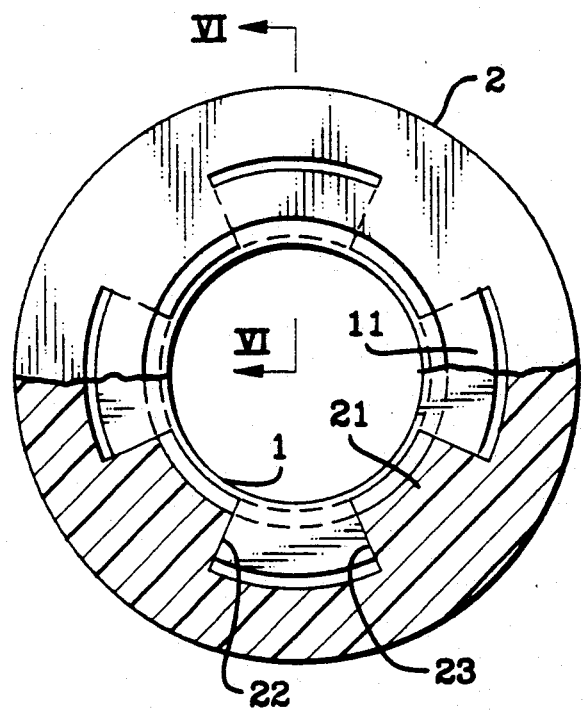
FIG. 5 is an axial cross-sectional view of a variant of the encoder.
Figure 6:
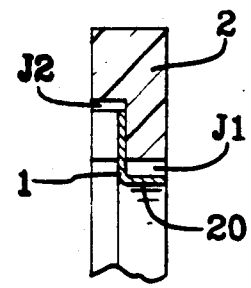
FIG. 6 is a radial cross-sectional view of the encoder along line VI—VI of FIG. 5.

FIGS. 5, 6 show an annular encoder in which outer thermoplastic ring 2 also contains a ferrite filler to form a multipolar magnetic ring.

According to this variant of the invention, the process of casting ring 2 requires the preparation of a specific mold cavity to form clearances J1, J2.

After the ring has been magnetized, the exposed outer or central section of disk 1 is attached or locked onto a revolving support surface. For this purpose, metal disk 1 has an outer mounting support surface 18, shown in FIG. 4, or an inner support surface 20, shown in FIG. 6, while retaining the radial separation J1 between the mounting support surface and the outer (FIG. 4) or inner (FIG. 5) periphery of ring 2. This support surface can be formed by stamping and/or bending the exposed section of the disk before casting.

The selection of the ferrite filler and the method of magnetizing the latter are not part of the invention. Reference can be made for example, to U.S. Pat. No. 3,169,567, which describes the composition of a material suitable for the ring and its magnetization process.

Figure 7:
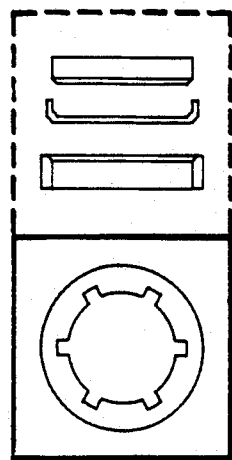
FIG. 7 is a block diagram of the phases of encoder production.

FIG. 7 is a block diagram showing a method for producing the encoder as represented by the principal successive steps:

First, cutting and possible stamping of the disk 1, 40;
Second, injection molding of ring 2, 50; and
Finally, magnetizing the composite ring, 60.

What is claimed is:

1. An encoder ring comprising:
a toothed annular metal disk having inner and outer peripheral surfaces; and
a toothed annular thermoplastic disk having inner and outer peripheral surfaces and being coaxial with the metal disk whereby the thermoplastic disk partly encases the metal disk, the teeth of the thermoplastic disk extending into the spaces between adjacent teeth on the metal disk such that relative rotation of the disks is prevented, there being a void between adjacent peripheral surfaces of the metal disk and the thermoplastic disk such that expansion and contraction of one of said disks relative to the other disk is permitted.

2. The encoder ring of claim 1 wherein the thermoplastic material contains a ferromagnetic material.

3. The encoder ring of claim 2 wherein the ferromagnetic material is magnetized.

4. The encoder ring of claim 1 wherein the metal disk is magnetized.

5. An encoder ring comprising:
a toothed annular metal disk having inner and outer peripheral surfaces, the teeth extending radially from one of the metal disk peripheral surfaces, the teeth having opposite radial sides, the surface of a tooth between the opposite radial sides defining a top surface, the surface of the metal disk between adjacent teeth defining a bottom surface; and
a toothed annular thermoplastic disk having inner and outer peripheral surfaces and being coaxial with the metal disk whereby the thermoplastic disk at least partly encases the metal disk teeth, the teeth of the thermoplastic disk extending into spaces between the teeth of the metal disk such that relative rotation of the disks is prevented, the thermoplastic disk teeth having opposite radial sides, the surface of a tooth between the opposite radial sides defining a top surface, the surface of the thermoplastic disk between adjacent teeth defining a bottom surface, the top surface of a thermoplastic disk tooth being separated from the adjacent metal disk bottom surface forming a void and the top surface of a metal ring tooth being separated from the adjacent thermoplastic disk bottom surface forming a void such that expansion and contraction of one of said disks relative to the other disk is permitted.

6. The encoder ring of claim 5 wherein the thermoplastic material contains a ferromagnetic material.

7. The encoder ring of claim 6 wherein the ferromagnetic material is magnetized.

8. The encoder ring of claim 5 wherein the metal disk is magnetized.

* * * * *

UNITED STATES PATENT AND TRADEMARK OFFICE
CERTIFICATE OF CORRECTION

PATENT NO. : 5,120,588
DATED : June 9, 1992
INVENTOR(S) : Denis Alff; Christian Hajzler It is certified that error appears in the above-indentified patent and that said Letters Patent is hereby corrected as shown below:

Item [73] on the cover page of the patent should read:

"Assignee: The Torrington Company, Torrington, Conn."

Signed and Sealed this

Twenty-ninth Day of March, 1994

Attest:

BRUCE LEHMAN

Attesting Officer     Commissioner of Patents and Trademarks